United States Patent [19]

French

[11] 4,375,151

[45] Mar. 1, 1983

[54] CONTROL IN WAVE ENERGY CONVERSION DEVICE EMPLOYING A FLEXIBLE WALLED ENCLOSURE

[76] Inventor: Michael J. French, United Kingdom Atomic Energy Authority, 11 Charles II St., London SW1Y 4QP, England

[21] Appl. No.: 189,915

[22] Filed: Sep. 23, 1980

[30] Foreign Application Priority Data

Oct. 3, 1979 [GB] United Kingdom ............... 7934366

[51] Int. Cl.³ .................... E02B 9/08; F03B 13/12
[52] U.S. Cl. .............................. 60/398; 290/53; 405/76; 417/330
[58] Field of Search ............ 60/398; 405/76; 290/53; 417/330

[56] References Cited

U.S. PATENT DOCUMENTS

| 3,353,787 | 11/1967 | Semo ........................... 417/330 X |
| 3,989,951 | 11/1976 | Lesster et al. ................ 417/330 X |
| 4,145,882 | 3/1979 | Thorsheim ..................... 290/53 X |
| 4,164,383 | 8/1979 | French ......................... 60/398 X |

*Primary Examiner*—George L. Walton
*Attorney, Agent, or Firm*—William R. Hinds

[57] ABSTRACT

Hydrostatic pressure of a passing wave crest causes collapse of flexible bags pumping air from the bags via a non-return valve into a high pressure air conduit 14a, 14b. The bags are re-inflated in the wave trough from a low pressure air conduit 13. One or more turbines 19, 21 are driven by air flow from the high to the low pressure air conduits. By controlling the restriction to air flow passing through the turbine(s) power extraction is optimized. By providing separately adjustable air flow circuits for the bow end and the stern end, differential control of the flow restriction in the two circuits provides control over pitching of the device.

7 Claims, 8 Drawing Figures

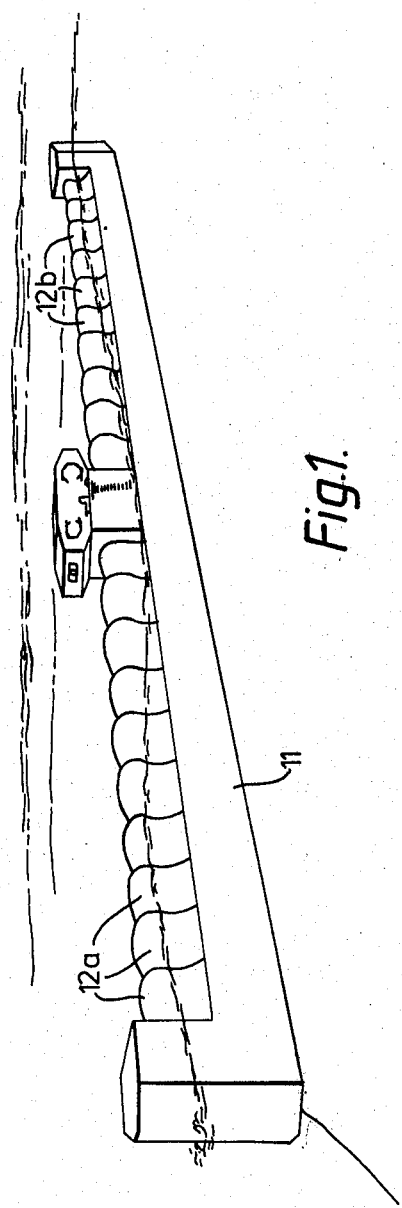
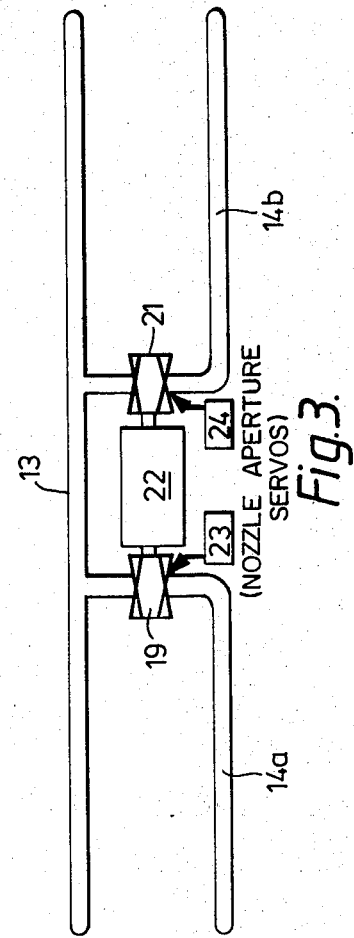

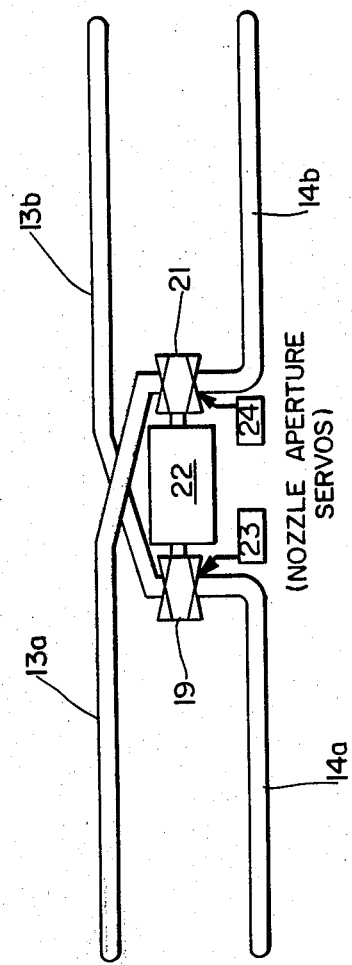

CONTROL IN WAVE ENERGY CONVERSION DEVICE EMPLOYING A FLEXIBLE WALLED ENCLOSURE

The invention relates to the control of a wave energy conversion device employing a flexible walled enclosure of the type described in U.S. Pat. No. 4,164,383.

If such a device has long gas conduits, these will smooth the gas flow to the energy conversion component (typically a turbine) which converts the gas flow into a more convenient form of energy. However, there will still be considerable pulsations in the gas pressure due to the irregular number of crests and troughs along the length of the enclosure, and also the large fluctuations in wave height.

It is an object of the present invention to provide a control system for improving the efficiency of extraction of energy from the gas flow under widely pulsating pressure variations.

A further feature of this type of device is that it is inherently bistable in pitch, tending to adopt a head down or stern down trim (referred to as "loll") in which only the middle portion of the flexible walled enclosure works.

It is a further object of the present invention to provide for control of the phase of pitching to improve the energy capture of the device.

Accordingly the invention provides a device for conversion of energy from water waves comprising an elongated enclosure having a flexible wall of impermeable material, the enclosure being divided into a plurality of compartments each containing gas, an outgoing gas conduit and a return gas conduit, each compartment being connected to the gas conduits via non-return valves arranged to permit one way passage of gas from the compartment into the outgoing gas conduit and to permit one way passage of gas from the return gas conduit into the compartment, an elongated support structure to which the flexible enclosure material is attached, the device being located for operation in water with the top of the flexible enclosure partly breaking or just below the surface so that as water waves pass along the device each compartment is subjected in turn to an external pressure alternation, gas being pumped when the external pressure is high from the compartment into the outgoing gas conduit and gas returning, when the external pressure is low, from the return gas conduit into the compartment, energy conversion means for producing work by expanding gas from the outgoing gas conduit into the return gas conduit, wave height sensor means for sensing wave height at at least one location along the length of the device, gas flow control means controlled by the wave height sensor means for adjusting the restriction to gas flow in the path through the said energy conversion means in predetermined dependence upon wave height sensed.

In the preferred arrangement the elongated enclosure is formed from flexible impermeable material and the compartments are formed by a series of dividing walls also of flexible impermeable material. However, it will be appreciated that a technically equivalent system is achieved if each compartment is formed separately like a bag and the bags are arranged in series on the support structure.

Preferably the energy conversion means comprises a turbine and the gas flow control means comprise a bladed turbine inlet nozzle with an aperture which is adjustable, for example by rotation of the nozzle blades about a radial axis. According to another of its aspects the invention provides a device for conversion of energy from water waves comprising an elongated enclosure having a flexible wall of impermeable material, the enclosure being divided into a plurality of compartments each containing gas, an outgoing gas conduit and a return gas conduit, each compartment being connected to the gas conduits via non-return valves arranged to permit one way passage of gas from the compartment into the outgoing gas conduit and to permit one way passage of gas from the return gas conduit into the compartment, an elongated support structure to which the enclosure material is attached, the device being located for operation in water with the top of the flexible enclosure partly breaking or just below the surface so that as water waves pass along the device each compartment is subjected in turn to an external pressure alternation, gas being pumped when the external pressure is high from the compartment into the outgoing gas conduit and gas returning, when the external pressure is low, from the return gas conduit into the compartment, at least two gas flow circuits, each circuit being associated with a respective compartment or group of compartments, and each circuit having independent gas flow control means, energy conversion means for producing work by expanding gas from an outgoing gas conduit into a return gas conduit, the respective compartment or group of compartments associated with one gas flow circuit being disposed on one side of the midpoint of the device, the respective compartment or group of compartments associated with the other or another gas flow circuit being disposed on the other side of the said midpoint, whereby independent control of the gas flow in the respective gas flow circuits controls the pitch of the device, pitch sensing means for sensing pitching of the device about the said midpoint, the gas flow control means being controlled by the pitch sensing means for adjusting the restriction to gas flow in each of said gas flow circuits so as to tend to reduce pitching of the device.

In a preferred arrangement according to the invention the or each pair of gas flow circuits is cross interconnected in the form of a figure of eight about the said mid point, one outgoing gas conduit being fed from flexible walled compartments on one side of the said mid point, the return gas after passing through the energy conversion means passing into the return gas conduit which feeds the flexible walled compartments on the other side of the said mid point, which lastmentioned compartments in turn feed into the other outgoing gas conduit of the pair, the return gas from which supplies the return gas conduit for the compartments on the said one side of the said mid point. It will be appreciated that this arrangement provides for increased effectiveness of the control of pitching by adjusting the restriction to gas flow in each of the gas flow circuits. Thus for example, if the device tends to pitch bow up an increase in restriction in gas flow through the circuit which is fed from the flexible walled compartments at the stern end and which feeds the return gas conduit for the flexible walled compartments at the bow end will result in starving the bow end of gas whilst resisting expulsion of gas from the flexible walled compartments at the stern end. In this way buoyancy at the stern end will increase whilst that at the bow end will decrease thus counteracting the tendency of the bow to pitch up.

Preferably wave height sensor means is also provided and the gas flow control means are additionally controlled for adjusting the restriction to gas flow in each of said gas flow circuits in predetermined dependence upon wave height sensed, the adjustment of the restriction to gas flow in response to the wave height sensing means being in the same sense in each of the gas flow circuits, whilst the adjustment of the restriction to gas flow in response to the pitch sensing means is such as to reduce flow in the gas flow circuit on the part of the device tending to pitch down and as to increase flow in the gas flow circuit on the part of the device tending to pitch up.

Specific constructions of wave energy conversion devices embodying the invention will now be described by way of example with reference to the drawings filed herewith, in which:

FIG. 1 is a diagrammatic perspective view of the device;

FIG. 3 represents diagrammatically gas flow circuits of the device;

FIG. 3A represents diagrammatically gas flow circuits of a variation; and

Figure 2A:
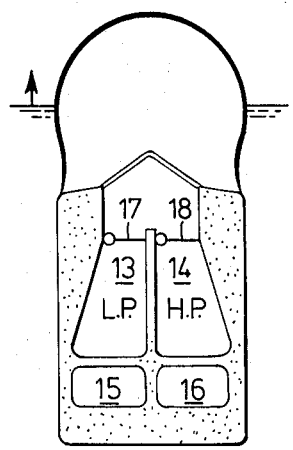
FIGS. 2A to 2D are diagrammatic cross-sectional views of the device showing various stages in its operating cycle.

The device comprises a long rigid beam 11, which, in operation, lies head to sea and is kept afloat by flexible air bags 12a, 12b attached along the top of the beam 11.

The beam 11 is of prestressed concrete and approximates to a box beam, the "box" being divided into four to provide two gas conduits 13, 14 and two sets of water-ballast tanks 15, 16. The beam 11 in this example is about 190 meters long, but indications now are that a shorter device would be more economical.

The flexible air bags are formed from reinforced rubber material in two ranges 12a and 12b respectively, each about 80 meters long with a continuous outer cover divided into 10 separate bags by transverse membranes. Each bag communicates with outgoing gas conduit 14 via a non-return valve 18 and with return gas conduit 13 via a non-return valve 17.

Figure 2B:
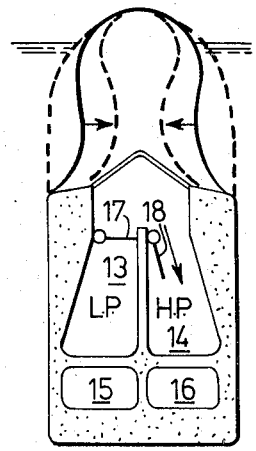
Figure 2C:
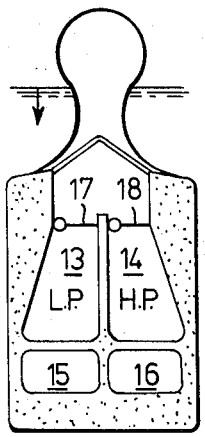
Figure 2D:
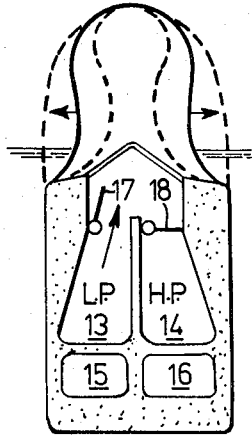

In operation, as a wave crest rises around a bag, the external pressure acting on the bag eventually exceeds the pressure in the bag causing it to collapse laterally, forcing air within the bag via non-return valve 18 into outgoing gas conduit 14—FIG. 2B. As the water level falls, the bag fills again from the return gas duct 13 via non-return valve 17—FIG. 2D.

From this it will be appreciated that the gas, conveniently air, in the outgoing gas conduit 14 is of high pressure whilst the gas in the return gas conduit 13 is at low pressure. The terms "high" and "low" in this context are relative, the difference being a head of water equal to about half the prevailing wave height.

Each flexible bag 12a, 12b operates more or less independently as a simple bellows pumping air from "low" to "high" pressure. The operation can be visualised as bags collapsing in a wave crest and so reducing its height, and expanding in a trough so tending to fill the trough.

The gas flow circuit is completed by air turbines through which air from the outgoing gas conduit 14 is expanded into the return gas conduit 13.

In order to provide the desired control of pitching the gas flow circuit in this example is divided into two. The range of flexible bags 12a at the bow end of the device feeds into one outgoing gas conduit 14a (FIG. 3) whilst the range of flexible bags 12b at the stern end of the device feeds into a separate outgoing gas conduit 14b. A common (low pressure) return conduit 13 is employed. Two single stage air turbines 19, 21 on the same shaft are fed respectively from the two outgoing gas conduits 14a, 14b and exhaust into the common return gas conduit 13. The turbines 19, 21 drive a generator 22. Gas flow through the turbines is controlled by conventional bladed nozzles of adjustable aperture, the setting of which determines the restriction to gas flow imposed by the nozzle. Adjustment of the setting of the nozzle blades is controlled by servo motors represented at 23 and 24 in FIG. 3.

In providing control signals for adjusting the setting of the turbine nozzle blades, two principal conditions are monitored namely wave height and pitch. The pitch is measured with an accelerometer in this example, but a pendulum or rate of turn indicator gyro could be employed. Wave height is measured by detecting hydrostatic pressures at the bow and the stern and correcting with the pitch measurement to give actual sea surface height above mean.

The servo motors 23, 24 are controlled to adjust the nozzle aperture setting of the two turbines 19, 21, together for optimizing power extraction at the wave height sensed and differentially to counteract loll. This may best be represented by nozzle aperture setting terms $(a+b)$ at turbine 19 and $(a-b)$ at turbine 21. "a" is a function of wave height, is increased for smaller waves and decreased for larger waves. "b" is a function of actual pitch history measured by the accelerometer and wave height history.

If $\theta$ is the pitch (bow down) and the nozzle aperture settings measured as blade angle settings are $(a+b)$ for the turbine 19 (fed from the bags 12a at the bow end) and $(a-b)$ for the turbine 21 (fed from the bags 12b at the stern end), then a simple form for "b" is $-K\theta$ where K is a constant having a value likely to be of the order of 3 to 5 degrees per degree. In a more advanced form, K would be a linear operator including differential, proportional and integral terms.

A simple form for "a" is $a = a_m - Hh_B$ where $a_m$ is a mean nozzle blade setting, $h_B$ is wave height at the bow corrected for pitch and H, typically about 3°/meter if a constant, would in general have three terms (as does the more advanced form of K referred to above). The value of $a_m$ would be based upon the last maximum of $h_B$.

Thus K would have the general form $C_1D + C_2 + C_3D^{-1}$ and H the general form $C_4D + C_5 + C_6D^{-1}$ where $C_1 \ldots C_6$ are constants, D represents the differential with respect to time of the variable being operated upon (pitch $\theta$ in the case of K and $h_B$ the corrected bow wave height in the case of H), and $D^{-1}$ represents the integral of that variable.

The parameters, that is the values of the constants $C_1$ to $C_6$, have to be matched to the particular design of wave energy conversion device and the expected sea conditions in the location in which it is to operate. The parameters are chosen to ensure stability over all sea conditions and to optimise power extraction. This latter involves:

(a) Governing the turbine capacity to suit each passing wave, roughly so as to keep the mean air flow rate constant while increasing the pressure drop for larger waves, and vice versa.

(b) Governing the phase relationship between wave and pitch angle, which will have little effect at some mean wavelengths but is expected to result in significant gains at others, particularly at wavelengths roughly equal to the length of the device.

Figure 4:
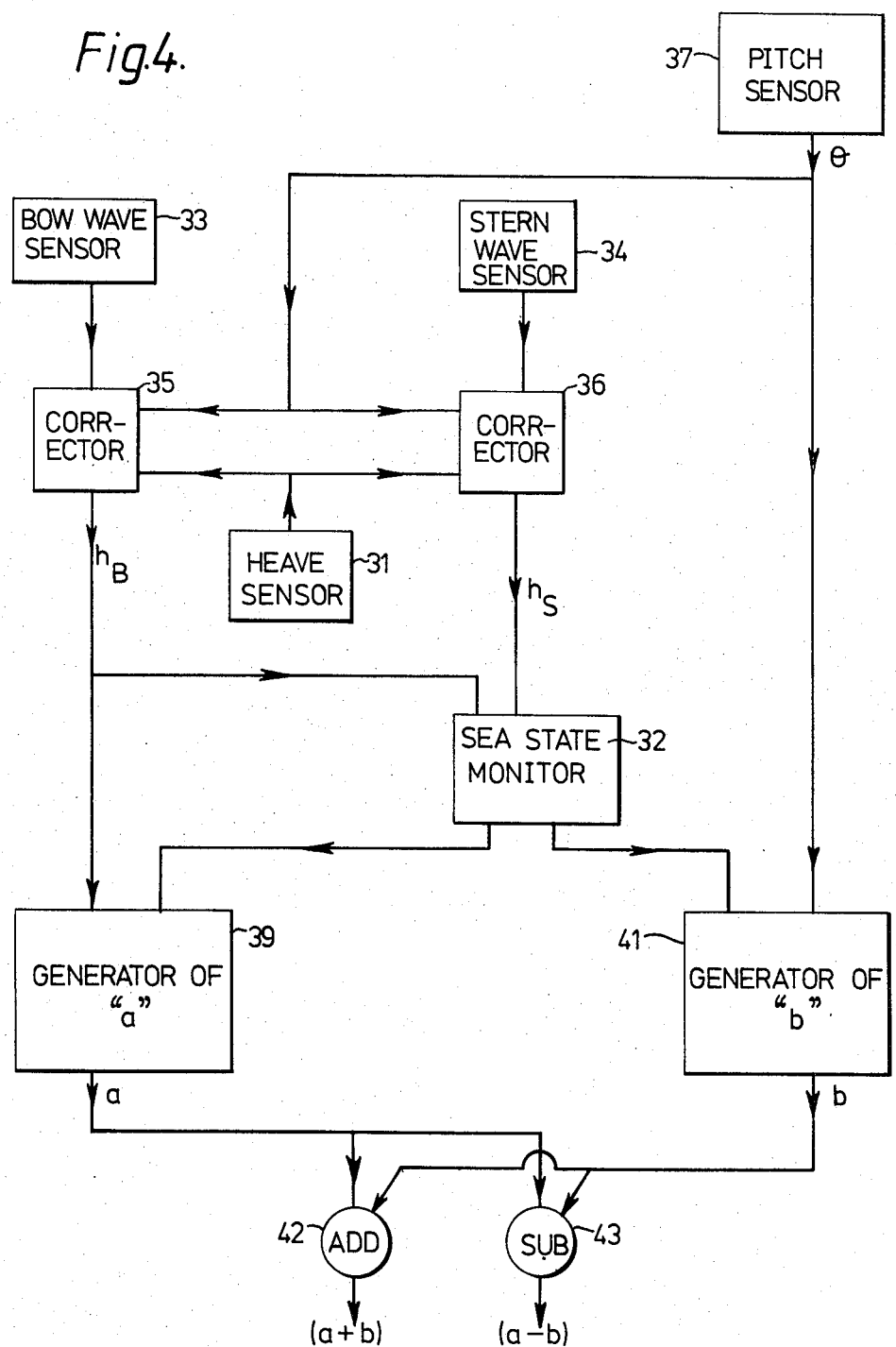
FIG. 4 is a block diagram of electrical components of a control system.

FIG. 4 illustrates diagrammatically the components of the control system.

Bow wave height sensor 33 and stern wave height sensor 34 provide hydrostatic indications of sea level at the bow and stern. These signals are combined in correctors 35, 36 with signals from pitch sensor 37 to provide corrected wave height signals $h_B$ and $h_S$. This correction is further refined in this example by reference to the signal output from a heave sensor 31. The various signals are combined in generators 39, 41 which respectively generate the control signals "a" and "b" through the operators K and H which are discussed above. The outputs "a" and "b" are added at 42 and subtracted at 43 to provide outputs (a+b) and (a−b) for the servo control motors 23, 24.

The values of the constants $C_1$ to $C_6$ for optimum power output are likely to be different for different sea states. A sea state monitor 32 is therefore incorporated for deriving a longer term indication of sea state and for adjusting the constants $C_1$ to $C_6$ accordingly. For example in heavier seas than normal it may be desirable to reduce $C_5$.

Typically the sea-state monitor 32 comprises signal processing equipment deriving from the pitch and wave height sensors digitised outputs representing sea state by averages over long time periods of such characteristics as zero crossing frequency and a measure of wave height. Based upon empirically determined relationships this information is converted by a microprocessor to changes in values of constants $C_1$ to $C_6$, and the operators H and K applied in the generators 39, 41 are adjusted accordingly.

Several variations in the configuration of the turbines, the high pressure gas conduits and the low pressure gas conduits can be adopted. Thus FIG. 3 shows a system with a common low pressure gas conduit and two high pressure gas conduits. One variation is to employ two low pressure gas conduits and a common high pressure gas conduit. Another variation is to employ two separate systems each having its own turbine, its own high pressure gas conduit and its own low pressure gas conduit.

A further variation exemplified by FIG. 3A is to employ two separate systems each having its own turbine, its own high pressure gas conduit 14a, 14b and its own low pressure gas conduit 13a, 13b, but to arrange for the high pressure gas conduit of one system to be fed from the range of flexible bags 12a at the bow end of the device, whilst the low pressure gas conduit of that system feeds the flexible bags 12b at the stern end of the device. Correspondingly the high pressure gas conduit of the second system is fed from the range of flexible bags 12b at the stern end of the device, whilst the low pressure return gas conduit of this second system feeds back into the range of flexible bags 12a at the bow end of the device.

This latter system (FIG. 3A) is in the form of a figure of eight and has an advantage over the other variations described above. The advantage is that corrections applied to one turbine work on both stern and bow sections of the device but, of course, in the opposite sense, thus magnifying the effectiveness of the corrections.

Whilst FIG. 3 shows separate turbines 19, 21 in each of the gas flow circuits, it is possible to employ a single turbine provided the turbine inlet is suitably divided and the nozzle blades in the different inlets are independently adjustable. Such a single turbine arrangement would be well suited to the configuration employing a common low pressure gas conduit, as illustrated in FIG. 3.

The invention is not restricted to the details of the foregoing example. An electrical control system is described in FIG. 4, but this and the servo motors could be pneumatic or hydraulic in form, if desired. In the arrangement described in FIG. 3 and its variations, two gas flow circuits are described. It will be appreciated that, if desired, there may be provided a plurality of pairs of gas flow circuits each with its own gas flow control system. However, it is believed that any consequent improvement in flexibility of control is unlikely to be worthwhile in view of the additional complication involved.

I claim:

1. A device for conversion of energy from water waves comprising an elongated enclosure having a flexible wall of impermeable material, the enclosure being divided into a plurality of compartments each containing gas, an outgoing gas conduit and a return gas conduit, each compartment being connected to the gas conduits via non-return valves arranged to permit one way passage of gas from the compartment into the outgoing gas conduit and to permit one way passage of gas from the return gas conduit into the compartment, an elongated support structure to which the flexible enclosure material is attached, the device being located for operation in water with the top of the flexible enclosure partly breaking or just below the surface so that as water waves pass along the device each compartment is subjected in turn to an external pressure alternation, gas being pumped when the external pressure is high from the compartment into the outgoing gas conduit and gas returning, when the external pressure is low, from the return gas conduit into the compartment, energy conversion means for producing work by expanding gas from the outgoing gas conduit into the return gas conduit, wave height sensor means for sensing wave height at at least one location along the length of the device, gas flow control means controlled by the wave height sensor means for adjusting the restriction to gas flow in the path through the said energy conversion means in predetermined dependence upon wave height sensed.

2. A device for conversion of energy from water waves comprising an elongated enclosure having a flexible wall of impermeable material, the enclosure being divided into a plurality of compartments each containing gas, an outgoing gas conduit and a return gas conduit, each compartment being connected to the gas conduits via non-return valves arranged to permit one way passage of gas from the compartment into the outgoing gas conduit and to permit one way passage of gas from the return gas conduit into the compartment, an elongated support structure to which the enclosure material is attached, the device being located for operation in water with the top of the flexible enclosure partly breaking or just below the surface so that as water waves pass along the device each compartment is subjected in turn to an external pressure alternation, gas being pumped when the external pressure is high from the compartment into the outgoing gas conduit and gas returning, when the external pressure is low, from the return gas conduit into the compartment, at least two gas flow circuits being provided, each circuit being associated with a respective compartment or group of compartments and each circuit having independent gas flow control means, energy conversion means for producing work by expanding gas from an outgoing gas conduit into a return gas conduit, the respective compartment or group of compartments associated with one gas flow circuit being disposed on one side of the midpoint of the device, the respective compartment or group of compartments associated with the other or another gas flow circuit being disposed on the other side of the said midpoint, whereby independent control of the gas flow in the respective gas flow circuits controls the pitch of the device, pitch sensing means for sensing pitching of the device about the said midpoint, the gas flow control means being controlled by the pitch sensing means for adjusting the restriction to gas flow in each of said gas flow circuits so as to tend to reduce pitching of the device.

3. A device as claimed in claim 2, wherein the or each pair of gas flow circuits is cross interconnected about the said mid point, one outgoing gas conduit being fed from flexible walled compartments on one side of the said mid point, the return gas after passing through the energy conversion means passing into the return gas conduit which feeds the flexible walled compartments on the other side of the said mid point, which lastmentioned compartments in turn feed into the other outgoing gas conduit of the pair, the return gas from which supplies the return gas conduit for the compartments on the said one side of the said mid point.

4. A device as claimed in claim 2 or claim 3, wherein wave height sensor means is also provided and the gas flow control means are additionally controlled for adjusting the restriction to gas flow in each of said gas flow circuits in predetermined dependence upon wave height sensed, the adjustment of the restriction to gas flow in response to the wave height sensing means being in the same sense in each of the gas flow circuits, whilst the adjustment of the restriction to gas flow in response to the pitch sensing means is such as to reduce flow in the gas flow circuit on the part of the device tending to pitch down and as to increase flow in the gas flow circuit on the part of the device tending to pitch up.

5. A device as claimed in claim 1 or claim 2, wherein substantially the whole of the elongated enclosure is formed from flexible impermeable material and the compartments are formed by a series of dividing walls also of flexible impermeable material.

6. A device as claimed in claim 1 or claim 2, wherein the or each energy conversion means comprises a turbine.

7. A device as claimed in claim 1 or claim 2, wherein the gas flow control means comprise a bladed turbine inlet nozzle with an aperture which is adjustable.

* * * * *